(12) United States Patent
Cappelli et al.

(10) Patent No.: US 8,826,534 B2
(45) Date of Patent: Sep. 9, 2014

(54) ROTOR BLADE REPAIR STRUCTURE AND METHOD

(75) Inventors: Marcus D. Cappelli, Shelton, CT (US); Wonsub Kim, Orange, CT (US); Joshua Mancher, Stamford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 247 days.

(21) Appl. No.: 13/328,361

(22) Filed: Dec. 16, 2011

(65) Prior Publication Data

US 2013/0152389 A1 Jun. 20, 2013

(51) Int. Cl.
*B23P 6/00* (2006.01)

(52) U.S. Cl.
USPC .................. 29/889.1; 29/402.09; 29/402.11

(58) Field of Classification Search
CPC .... B23P 6/0005; B23P 43/00; B23P 2556/00; B23P 17/10963; F01D 5/005
USPC .............. 29/402.04, 402.09, 402.11, 889.1; 156/94, 98
See application file for complete search history.

(56) References Cited

U.S. PATENT DOCUMENTS

| 3,782,856 | A | | 1/1974 | Salkind et al. |
| 5,908,522 | A | * | 6/1999 | Lofstrom et al. ............... 156/94 |
| 5,958,166 | A | * | 9/1999 | Walters et al. ................. 156/94 |
| 7,237,751 | B2 | | 7/2007 | Anning |
| 7,883,760 | B2 | * | 2/2011 | Bogue .......................... 428/116 |
| 7,927,077 | B2 | * | 4/2011 | Olson ...................... 416/229 R |
| 2008/0159870 | A1 | | 7/2008 | Hong |
| 2012/0080135 | A1 | * | 4/2012 | Evens et al. .................... 156/94 |

* cited by examiner

*Primary Examiner* — Alexander P Taousakis
(74) *Attorney, Agent, or Firm* — Cantor Colburn LLP

(57) ABSTRACT

A method of repairing a damaged portion of a rotor blade includes filling the damaged portion with a filler material. A pre-cured patch assembly is applied over the damaged portion, the patch assembly including one or more laminate packs positionable at at least one of an upper rotor blade surface and a lower rotor blade surface and one or more overwrap plies positionable over the upper rotor blade surface and the lower blade surface. A repair structure for a damaged portion of a rotor blade includes a volume of fill material disposed at the damaged portion.

11 Claims, 4 Drawing Sheets

ROTOR BLADE REPAIR STRUCTURE AND METHOD

FEDERAL RESEARCH STATEMENT

This invention was made with Government support under Agreement No. W911W6-08-2-0006 for Rotor Durability Army Technology Objective (ATO). The Government has certain rights in the invention.

BACKGROUND OF THE INVENTION

The subject matter disclosed herein relates to rotor blades. More specifically, the subject disclosure relates to repair of composite structure rotor blades.

Rotor blades, for example, main rotors of helicopters, are often formed from composite materials including graphite, fiberglass, or other such materials. While having certain advantages over rotor blades formed from other materials, when a composite rotor blade is damaged repairs can be costly and time consuming. Of particular concern are trailing edge areas of the rotor blades, where severe limitations are placed on what conditions are repairable, so that even blades with damage such as scratches, or delaminations between plies can result in the blade requiring extensive repair procedures to be performed, such as stripping and rebuilding of the blade.

BRIEF DESCRIPTION OF THE INVENTION

According to one aspect of the invention, a method of repairing a damaged portion of a rotor blade includes filling the damaged portion with a filler material. A patch assembly is applied over the damaged portion, the patch assembly including a precured laminate pack positionable at least one of an upper rotor blade surface and a lower rotor blade surface and one or more precured overwrap plies positionable over the upper rotor blade surface and the lower blade surface.

According to another aspect of the invention, a repair structure for a damaged portion of a rotor blade includes a volume of fill material disposed at the damaged portion. One or more precured laminate packs are located over the fill material at least one of an upper rotor blade surface and a lower rotor blade surface. One or more precured overwrap plies are affixed over the precured laminate pack over the upper rotor blade surface and the lower blade surface.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
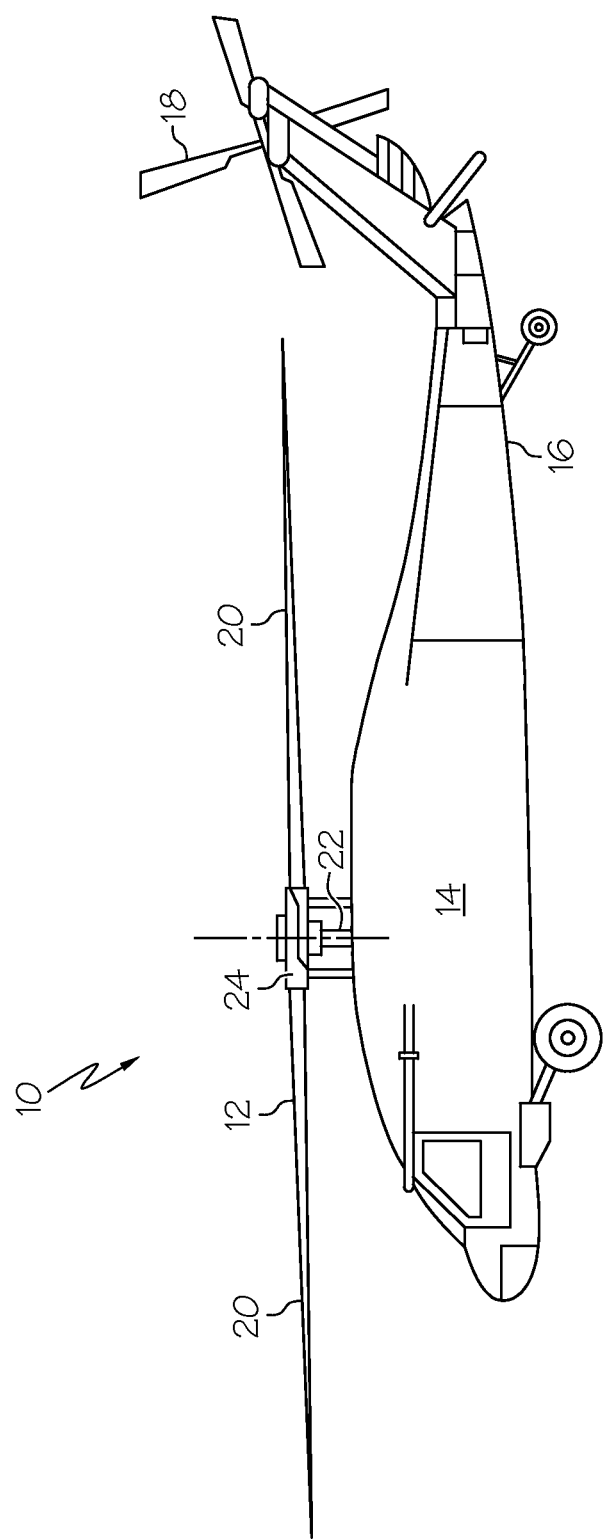
FIG. 1 is a schematic view of an embodiment of a helicopter.

Shown in FIG. 1 is a schematic of a rotary wing aircraft, in this embodiment, a helicopter 10. The helicopter 10 includes a main rotor assembly 12, and an airframe 14 having an extending tail 16 at which is mounted an anti-torque rotor 18. Although the aircraft illustrated is a helicopter 10, it is to be appreciated that other machines, such as turbo props, tilt-rotor aircraft, or wind turbines may also benefit from the system of the present disclosure. Further, while the description herein is of the system applied to the main rotor assembly 12 if a helicopter 10, it may also be applied to the anti-torque rotor 18. The main rotor assembly 12 includes a plurality of blade assemblies 20 located about a rotor shaft 22 via a swashplate 24.

Figure 2:
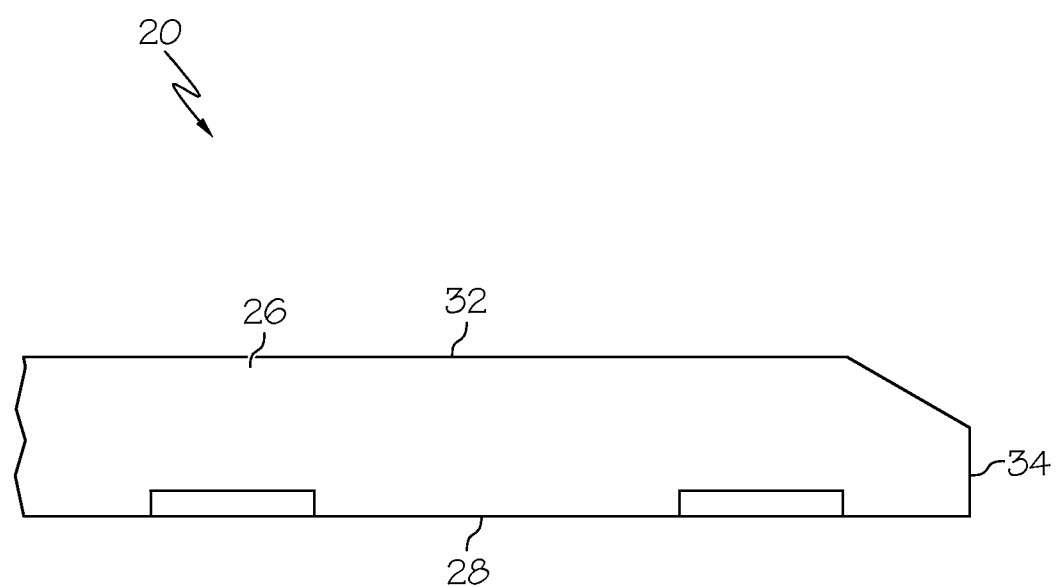
FIG. 2 is a plan view of an embodiment of a rotor blade for a helicopter.

Referring now to FIG. 2, each blade assembly 20 includes a rotor blade 26 with a leading edge 32 and a trailing edge 28. The trailing edge 28 is formed of a plurality of material plies 30 (best shown in FIG. 3), in some embodiments, a graphite material, which are bonded together. While the structure and method described below is directed toward repair of the trailing edge 28, it is to be appreciated that the repair may be utilized at other portions of the rotor blade 26, for example, the leading edge 32 or a blade tip 34.

Figure 3:
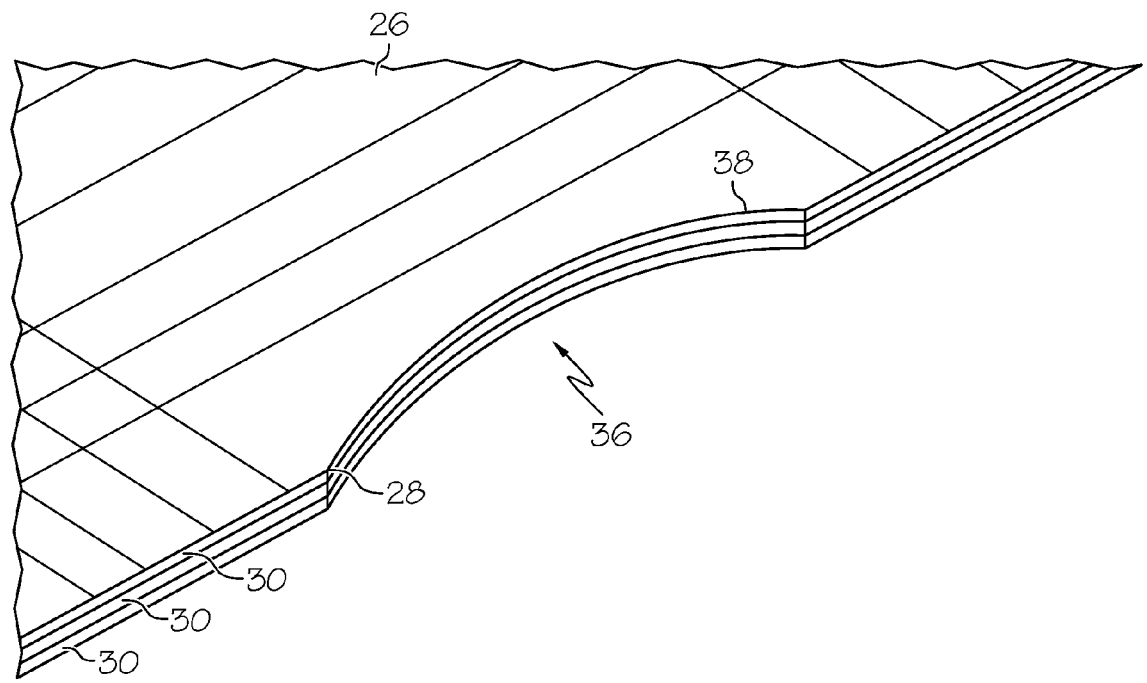
FIG. 3 is a perspective view of a trailing edge portion of a rotor blade.

Referring to FIG. 3, during operation of the helicopter 10, the blade assembly 20 may become damaged, as indicated by damaged area 36. The damaged area 36 is removed from the trailing edge 28 leaving a specified repair shape 38, determined by limit loads of the blade assembly 20. In some embodiments, as shown, the repair shape 38 is an arc or a segmented arc (having a flat portion interposed between two arc segments), and in some embodiments the repair shape has a width that is about 10 times the depth.

Figure 4:
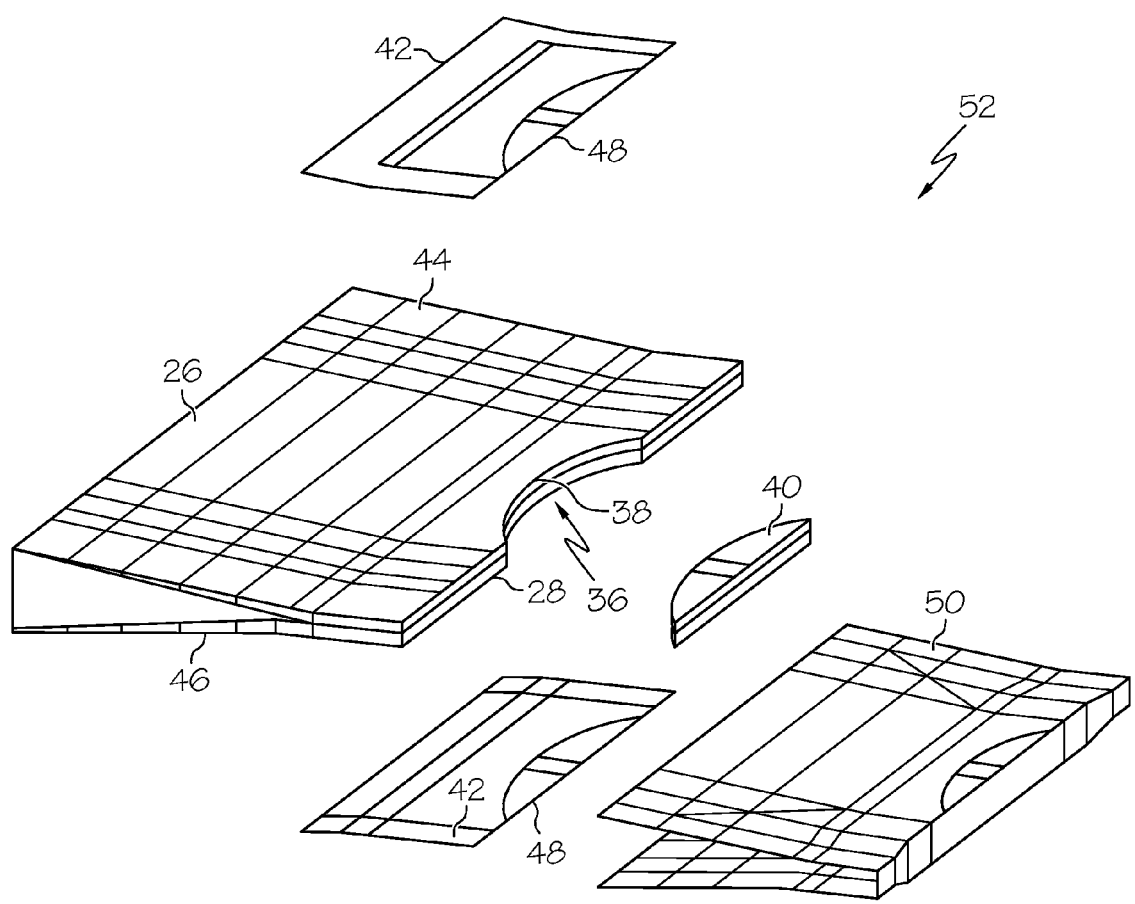
FIG. 4 is an exploded view of an embodiment of a repair structure for a rotor blade.

Referring now to FIG. 4, the repair shape 38 is filled with a filler material 40, which may be a mixture of adhesive and fiberglass powder, fiberglass whisker or other suitable material. Once the filler material 40 is applied, it is cured in position and sanded to a desired finish. In an alternative embodiment, a precured filler material 40 is bonded into the damaged area 36 with an adhesive. For example, a foaming adhesive or fiberglass material cut to a selected shape may be used. Further, in some embodiments, the damaged area is not removed 36 to leave a repair shape or prepared damage area 38, and the filler material 40 is applied directly to the damaged area 36.

A patch assembly 52 is then installed over the repair prepared damage area 38. The patch assembly 52 includes one or more patch laminate packs 42. The patch laminate packs 42 are configured to substantially conform to an upper blade surface 44 and/or a lower blade surface 46, covering the damaged area 38 and filler material 40. Each patch laminate pack 42 includes a plurality of plies 48, which are assembled and in some embodiments precured separately. In some embodiments, the patch laminate pack 42 is four plies 48 of material that may be the same material, or alternatively may be of at least two different materials. In some embodiments, the patch laminate pack 42 is formed of plies 48 of two materials, stacked in an alternating fashion, for example, alternating layers of woven fiber glass/epoxy prepreg fabric and carbon fiber tape. Additionally, other composite materials, for example, Kevlar, may be utilized. In one embodiment, the patch laminate pack is formed of four plies 48.

The patch laminate packs 42 are then integrated with an overwrap ply 50. The overwrap ply 50 is substantially U-shaped in cross-section and is configured to overwrap the patch laminate packs 42 and the trailing edge 28. The overwrap ply 50 is an assembly of one or more plies of woven fiber glass/epoxy prepreg, Kevlar, carbon fiber tape, or other composite material. Once the patch laminate packs 42 and the overwrap ply 50 are cured into the patch assembly 52, the patch assembly 52 is secured to the rotor blade assembly 20 such that the patch assembly 52 covers the repair area 42 at the upper blade surface 44 and/or the lower blade surface 46, wrapping over the trailing edge 28. The resulting rotor blade assembly 20 including the repair components is cured at room temperature under vacuum or mechanical pressure for, in some embodiments, 24 hours. Alternatively, the assembly 20 may be cured under heat to shorten the cure time. In some embodiments, in addition to an overwrap ply 50, the patch assembly 52 includes an underwrap ply located between the patch laminate packs 52 and the rotor blade assembly 20.

While in the embodiments described above, the patch assembly 52 is installed to the rotor blade assembly 20 as a unitary piece, in other embodiments it may be installed to the rotor blade assembly 20 as multiple components. For example the patch laminate packs 52 may be installed to the upper blade surface 44 and lower blade surface 56. Next, the overwrap ply 50 may be installed.

The repair described herein allows for repairs to significant portions of the rotor blade assembly 20, particularly the trailing edge 28, while being configured to mimic the stiffness of the original rotor blade assembly 20, i.e. so that any variations in blade strength and dynamic properties are acceptable with respect to operability and structural integrity of the original rotor blade assembly 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of repairing a damaged portion of a rotor blade comprising:
    filling the damaged portion with a filler material;
    curing the filler material at the damaged portion;
    arranging a plurality of plies into a stack;
    at least partially curing the plurality of plies together into a laminate pack;
    securing an overwrap ply to the laminate pack resulting in a patch assembly;
    positioning the patch assembly at the rotor blade such that:
        the laminate pack is positioned at an upper rotor blade surface or lower rotor blade surface and covers the damaged portion; and
        the overwrap ply covers the laminate pack and wraps from the upper blade surface over the trailing edge onto the lower blade surface; and
    securing the patch assembly to the rotor blade via a cure.

2. The method of claim 1, further comprising removing material from the damaged portion.

3. The method of claim 2, wherein the material is removed from the damaged portion in a segmented arc shape.

4. The method of claim 1, wherein the filler material comprises a mixture of adhesive and one of a fiberglass powder or fiberglass whisker.

5. The method of claim 1, wherein the plurality of plies comprise plies of two or more materials.

6. The method of claim 5, wherein the two or more materials include woven fiber glass/epoxy prepreg fabric, Kevlar or carbon fiber tape.

7. The method of claim 1, wherein the overwrap ply comprises one or more plies of woven fiber glass/epoxy prepreg, Kevlar, or carbon fiber tape.

8. The method of claim 1, further comprising affixing the patch assembly to the rotor blade via adhesive.

9. The method of claim 1, wherein the damaged portion is at a trailing edge of the rotor blade.

10. The method of claim 9, further comprising conforming the patch assembly over the trailing edge.

11. The method of claim 1, further comprising installing the patch assembly as a unitary element.

\* \* \* \* \*